US012589481B2

(12) United States Patent
Fly et al.

(10) Patent No.: US 12,589,481 B2
(45) Date of Patent: Mar. 31, 2026

(54) TOOL ATTRIBUTE MANAGEMENT IN AUTOMATED TOOL CONTROL SYSTEMS

(71) Applicant: Snap-on Incorporated, Kenosha, WI (US)

(72) Inventors: David C. Fly, Maumelle, AR (US); Matthew J. Lipsey, Sherwood, AR (US); Preston C. Phillips, Conway, AR (US); Traig E. Born, Beebe, AR (US); Frederick J. Rogers, North Little Rock, AR (US); Joseph Chwan, Mechanicsburg, PA (US); Gavin Pavlick, Lake Bluff, IL (US); Cody Houston, Conway, AR (US)

(73) Assignee: Snap-on Incorporated, Kenosha, WI (US)

( * ) Notice: Subject to any disclaimer, the term of this patent is extended or adjusted under 35 U.S.C. 154(b) by 51 days.

(21) Appl. No.: 18/736,325

(22) Filed: Jun. 6, 2024

(65) Prior Publication Data

US 2024/0408741 A1 Dec. 12, 2024

Related U.S. Application Data

(60) Provisional application No. 63/506,559, filed on Jun. 6, 2023.

(51) Int. Cl.
*B25H 3/02* (2006.01)
*G06Q 10/087* (2023.01)
*G06T 7/00* (2017.01)

(52) U.S. Cl.
CPC ........... *B25H 3/028* (2013.01); *G06Q 10/087* (2013.01); *G06T 7/0008* (2013.01)

(58) Field of Classification Search
CPC ..... B25H 3/028; G06Q 10/087; G06T 7/0008
See application file for complete search history.

(56) References Cited

U.S. PATENT DOCUMENTS 11,631,048 B1 * 4/2023 McNamara .......... G06Q 10/087
705/28
2009/0281925 A1 11/2009 Winter et al.
(Continued)

OTHER PUBLICATIONS

ISA/US—Int'l. Search Report for related I.A. No. PCT/US2024/032854 filed Jun. 6, 2024, mailed Sep. 26, 2024, 7 pgs.

*Primary Examiner* — Yu Chen
(74) *Attorney, Agent, or Firm* — McDermott Will & Schulte LLP

(57) ABSTRACT

An inventory control system comprises a tool storage device including a drawer, a tray, or a shelf having a plurality of storage locations for storing a plurality of objects which define a silhouette in the tool storage device. The inventory control system comprises a sensing device configured to sense color, a display device configured to display information about the inventory control system, and a processor and a memory. The memory stores instructions causing the processor to determine a plurality of colors of the plurality of objects stored in the tool storage device, which also causes the processor to generate an image in the form of an arrangement of colored blocks, wherein the display of color blocks represent associated color data of the plurality of objects and a size of each color block is proportional to the percentage of RGB color data in the silhouette.

20 Claims, 10 Drawing Sheets

(56)         References Cited

U.S. PATENT DOCUMENTS

2011/0121699 A1*   5/2011   Freimuth ............... B25H 3/028
                                                                   312/237
2013/0250117 A1*   9/2013   Pixley ...................... B25H 3/00
                                                                   348/143
2016/0098831 A1*   4/2016   Glickman ............. G06V 20/66
                                                                   705/28
2019/0088061 A1*   3/2019   Phillips .............. G07C 9/00912
2020/0034992 A1    1/2020   Gershon et al.
2020/0380464 A1*  12/2020   Reid .................... G06Q 10/087
2021/0089774 A1*   3/2021   Lipsey ..................... B25H 3/00
2021/0158040 A1*   5/2021   Lipsey .................. G06N 20/00
2021/0304122 A1    9/2021   Dattamajumdar et al.
2023/0351324 A1*  11/2023   Reddy Yaddala ... G06Q 10/087

* cited by examiner

<u>106</u>

TOOL ATTRIBUTE MANAGEMENT IN AUTOMATED TOOL CONTROL SYSTEMS

CROSS-REFERENCE TO RELATED APPLICATIONS

The present application claims the benefit of U.S. provisional patent application No. 63/506,559, entitled "TOOL ATTRIBUTE MANAGEMENT IN AUTOMATED TOOL CONTROL SYSTEMS," filed Jun. 6, 2023. The entire content of this application is the complete contents of which are incorporated herein by reference.

TECHNICAL FIELD

The present subject matter relates to automated tool control systems, and to managing data associated with attributes of tools in the automated tool control system.

BACKGROUND

Automated tool control systems can employ a variety of technologies used to determine presence and absence of items (tools) stored within the device. Some examples of the technologies used are single or multiple cameras, passive UHF RFID tags and antennae in the 866-868 UHF and 902-926 UHF frequency bandwidths, low power nearfield RFID tags, scales, Photoelectric beams and cells, and other means. Recurring instances of "Wrong Tool" occurrences in a tool control system disrupt production and maintenance procedures and negatively affect productivity and profitability. Thus, there is a need for an improved system that enables the tool control system to manage the data received by the camera.

SUMMARY

One embodiment of the disclosure relates to an inventory control system comprises a tool storage device including a drawer, a tray, or a shelf having a plurality of storage locations for storing a plurality of objects. The plurality of objects defines a silhouette in the tool storage device. The inventory control system comprises a sensing device configured to sense color. The inventory control system also comprises a display device configured to display information about the inventory control system. The system further comprises a processor and a memory. The memory stores instructions causing the processor to determine a plurality of colors of the plurality of objects stored in the tool storage device. The instructions also cause the processor to generate at least one image in comprising an arrangement of colored blocks. The colored blocks represent color data associated with the plurality of objects, and the size of each colored block is proportional to a percentage of color data in the color signature of each silhouette. The instructions are also configured to display the arrangement of colored blocks.

In another embodiment, the present disclosure relates to a method for determining the components in a tool storage device. The method includes receiving color data from a sensing device in the tool storage device. The method includes determining the colors of the plurality of objects stored in the tool storage device, wherein the tool storage device including a drawer, a tray, or a shelf having a plurality of storage locations for storing a plurality of objects, wherein the plurality of objects defines a silhouette in the tool storage device. The method includes generating at least one image in comprising an arrangement of colored blocks.

The colored blocks represent color data associated with the plurality of objects and a size of each colored block is proportional to a percentage of color data in the color signature of each silhouette. The method can includes displaying the arrangement of colored blocks on a display device.

In yet another embodiment, the disclosure includes a non-transitory computer-readable storage medium comprising instructions. Instructions are executed by one or more processors that cause the one or more processors to perform operations for determining a location status of an item in a tool storage device. The instructions of the non-transitory computer-readable storage medium include receiving color data from a sensing device in the tool storage device. The instructions of the non-transitory computer-readable storage medium include determining the colors of the plurality of objects stored in the tool storage device, wherein the tool storage device including a drawer, a tray, or a shelf having a plurality of storage locations for storing a plurality of objects, wherein the plurality of objects defines a silhouette in the tool storage device. The instructions of the non-transitory computer-readable storage medium include generating at least one image in comprising an arrangement of colored blocks. The colored blocks represent color data associated with the plurality of objects and a size of each colored block is proportional to a percentage of color data in the color signature of each silhouette. The instructions of the non-transitory computer-readable storage medium include displaying the arrangement of colored blocks on a display device.

BRIEF DESCRIPTION OF DRAWINGS

The present disclosure is illustrated by way of example, and not by way of limitation, in the accompanying drawings, wherein elements having the same reference numeral designations represent like elements throughout and wherein.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

To address the issues described in the Background, the system uses color cameras, special lensing, a mirror, and storage foam layers in drawers which contain foam layers with silhouette cutouts and base layers of contrasting color to the foam layer. The foam layers are typically blue, and the base layer is typically yellow. Each of the silhouettes is assigned a specific stored item.

The cameras provide Red, Green, and Blue (RGB) image data to the system for use in determining a location status (e.g. presence and absence of the stored items). The tool control system does this by defining silhouette profiles within defined Regions of Interest, training the cameras to acquire and store image related RGB color attributes (data) for the defined silhouettes when the stored items are both present and absent. The color attributes associated with the RGB image data can comprise numerical parameters that define the boundaries of a particular color in the spectrum of color data.

The reference images of the empty and full silhouettes are obtained during the tool training process when the storage silhouettes pass through the camera field of view while the system drawers are being opened and/or closed. The system is trained to identify whether a tool is present or absent by comparing RGB color data signatures of a scanned silhouette with the stored calibration reference data signatures.

Figure 1:
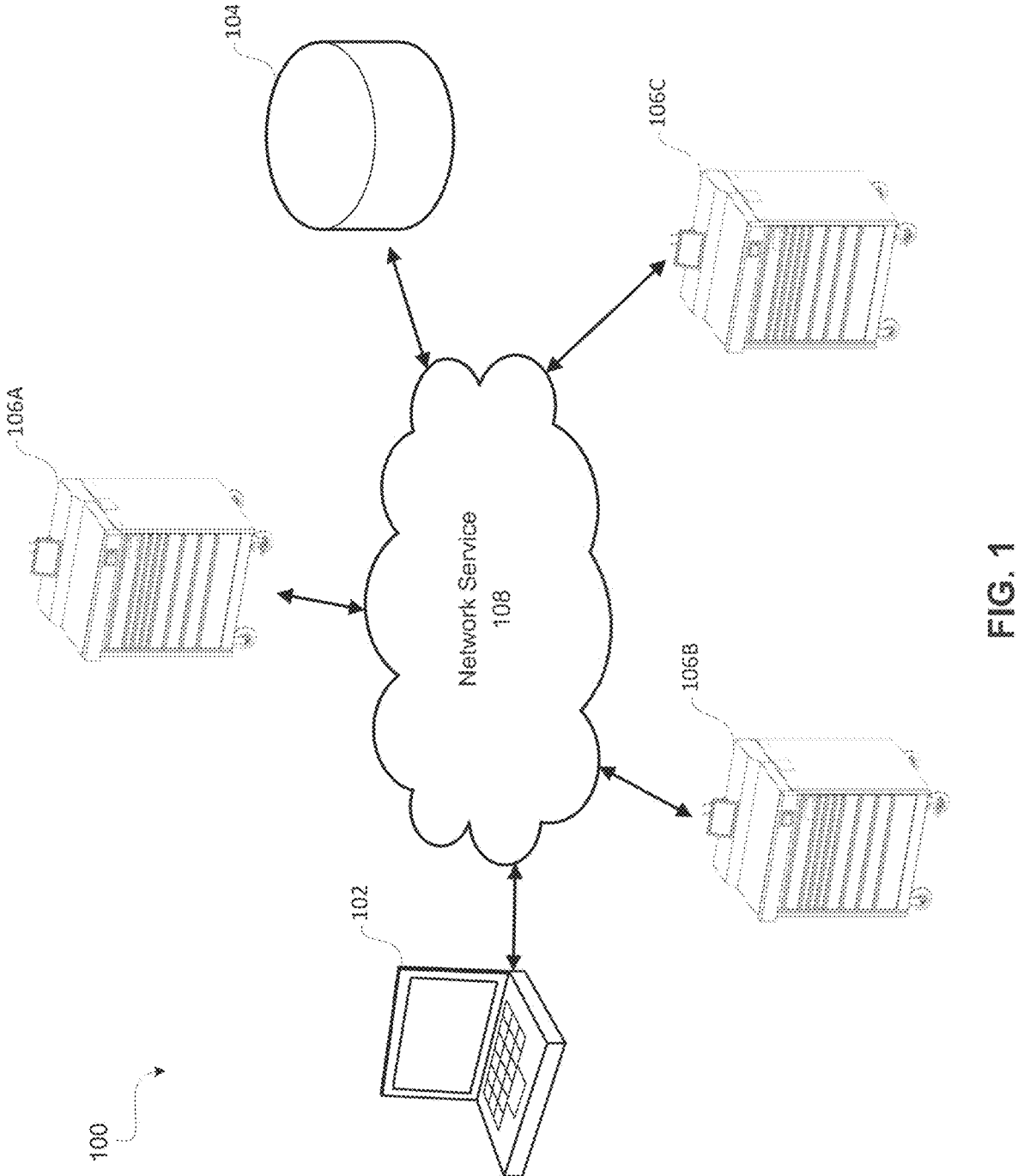
FIG. 1 is illustrative of an environment comprising a plurality of storage containers in communication with computing devices and storage.

FIG. 1 illustrates an exemplary automated tool control system 100 according to example aspects of the subject technology. The automated tool control system 100 includes an administrative computing device 102, a database 104, tool control storage devices 106A, 106B, and 106C (each equipped with a local computing device and hereinafter collectively referred to as "tool control storage devices 106"), a network service and a network 108. In some aspects, the automated control system 100 can have more or fewer computing devices (e.g., 102), databases (e.g., 104), and/or tool control storage devices (e.g., 106A, 106B, and 106C) than those shown in FIG. 1.

The local computing device 102 in each tool storage device can represent various forms of processing devices that have a processor, a memory, and communications capability. The processor may execute computer instructions stored in memory. By way of non-limiting example, local processing devices typically include small form factor embedded or industrial Mini-ITX, Micro-ATX, ATX, or Extended ATX motherboard computers or any comparably sized and capable processing devices. The computing device 102 is configured to communicate with the database 104 and the tool control storage devices 106A, 106B, and 106C via the network 108. By way of non-limiting example, processing devices can include a desktop computer, a laptop computer, a handheld computer, a personal digital assistant (PDA), or a combination of any of these processing devices or other processing devices.

The database 104 is a data storage for storing configurable parameters associated with the user identification (ID) and data associated with stored items and issue return functions. The text files, audio files, and video files may be accessed by the tool control storage devices 106A, 106B, and 106C which may use the configurable parameters stored in the database 104.

The tool control storage devices 106A, 106B, and 106C (hereinafter collectively referred to as "tool control storage devices 106") are configured to transfer and receive data to and from the database 104 via the network service. Data may include configurable parameters, such as text files, audio files, and video files required for configuring the tool control storage devices 106 according to user preferences. Database 104 also stores issue and return history, stored item status and other data relative to operation of an Automated Tool Control system.

The tool control storage device 106 is a toolbox in most embodiments. The tool control storage devices 106 may also be tool lockers or any other secure storage devices or enclosed secure storage areas (e.g., a tool crib or walk-in tool locker). Each of the tool control storage devices 106 is an example of a highly automated inventory control system that utilizes multiple different sensing technologies for identifying inventory conditions of objects in the storage unit.

Illustrative features include the ability to process complex image data with efficient utilization of system resources, autonomous image and camera calibrations, identification of characteristics of tools from image data, adaptive timing for capturing inventory images, efficient generation of reference data for checking inventory status, autonomous compensation of image quality, etc.

Figure 2A:
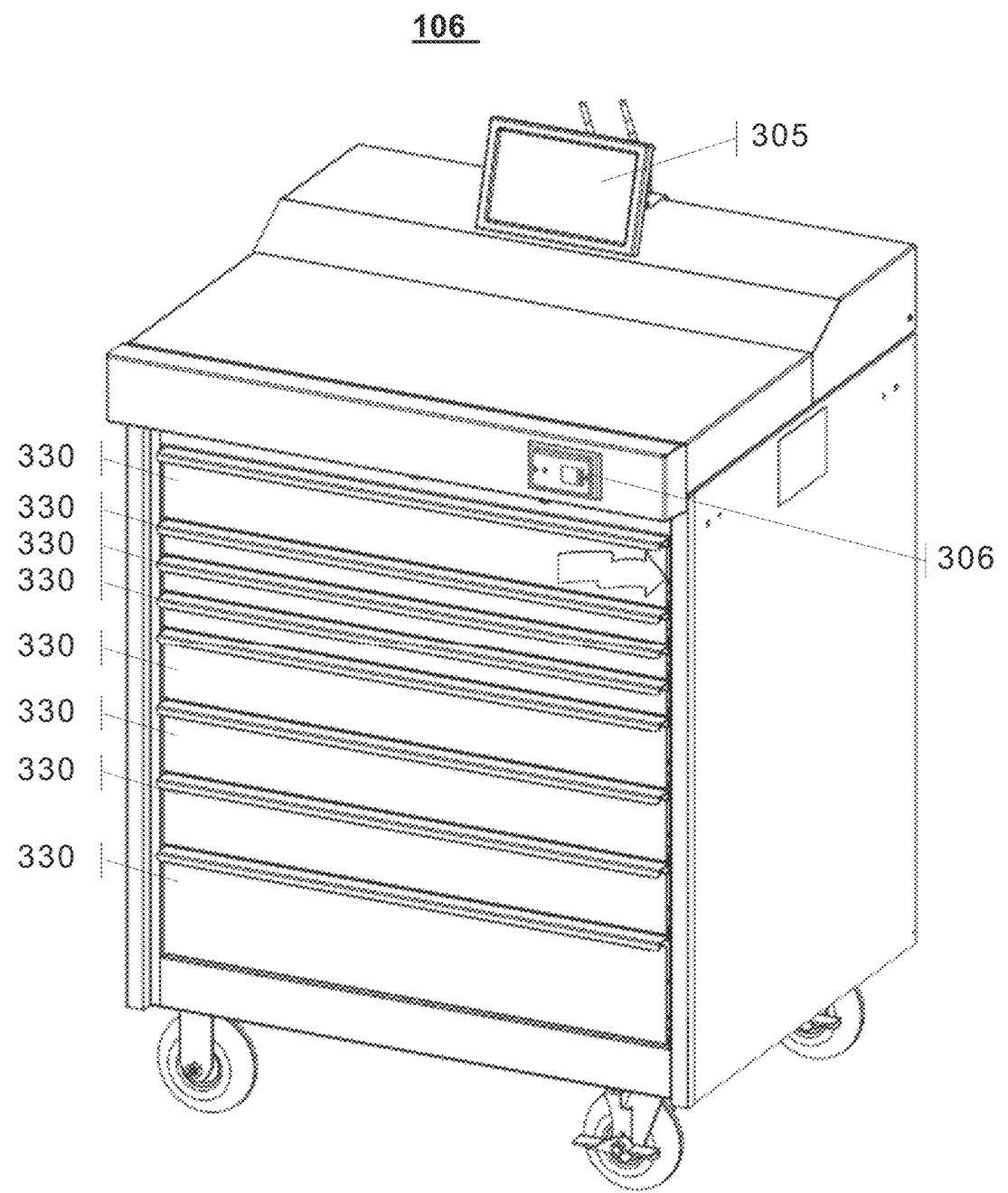
FIG. 2A depicts an exemplary tool storage system according to this disclosure.
Figure 2B:
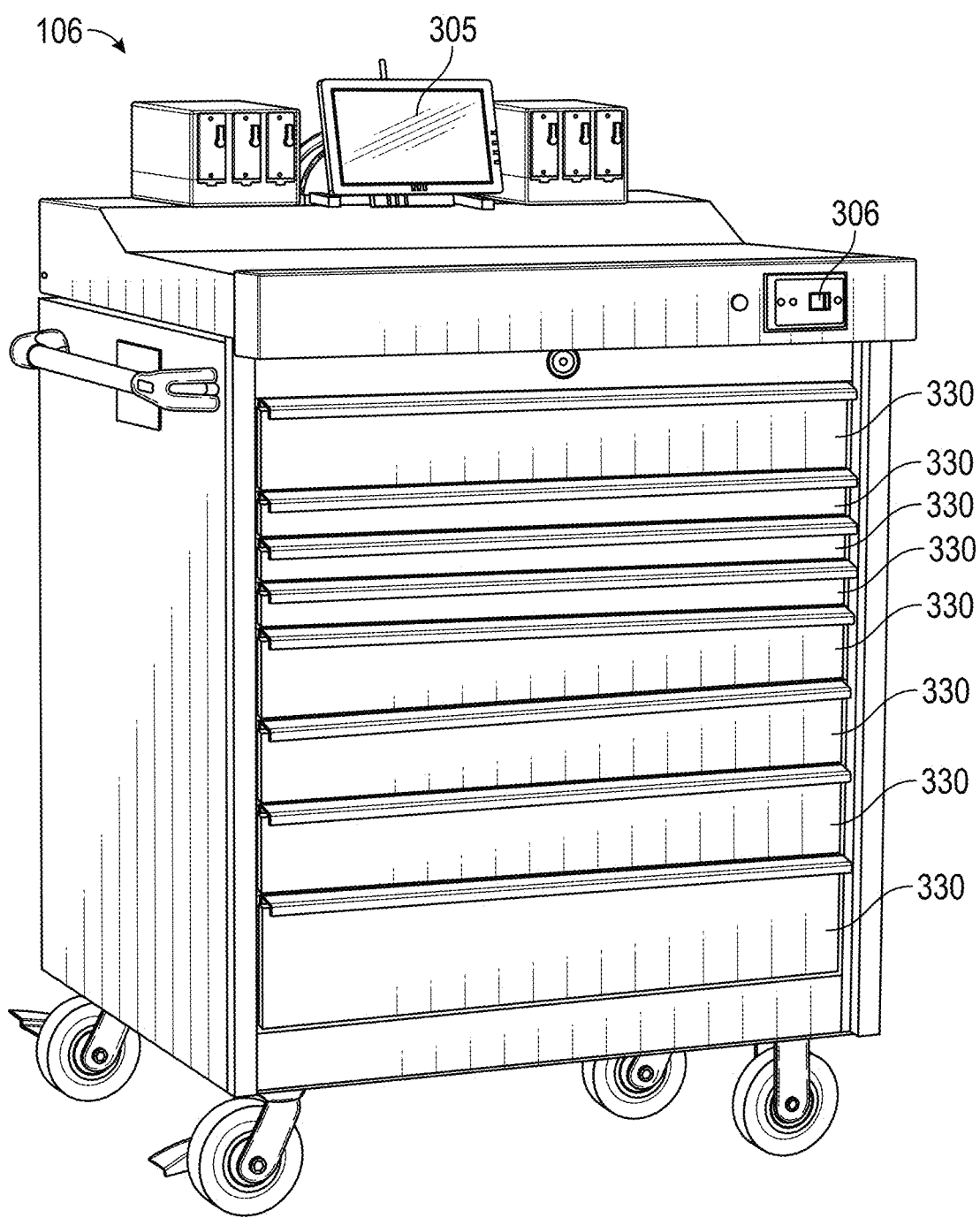
FIG. 2B depicts an exemplary tool storage system according to this disclosure.

FIGS. 2A and 2B illustrate various exemplary tool control storage devices 106. The tool control storage device 106 includes a user interface 305, an access control device 306, such as a card reader, for verifying identity and authorization levels of a user intending to access tool control storage device 106, and multiple tool storage drawers 330 for storing tools. The storage system may include shelves, compartments, containers, or other object storage devices from which tools or objects are issued and/or returned, or which contain the storage device from which the objects are issued and/or returned. In further examples, the storage system includes storage hooks, hangers, toolboxes with drawers, lockers, cabinets with shelves, safes, boxes, closets, vending machines, barrels, crates, and other material storage means.

User interface 305 is an input and/or output device of the tool control storage device 106, configured to display information to a user. Information may include work instructions, tool selection, safety guidelines, torque settings, system and tool status alerts and warnings. For instance, the user interface 305 may be configured to display the information in text strings and images in the default language assigned to the user who currently has access to the tool control storage device 106. Although not illustrated in FIGS. 2A and 2B, the tool control storage device 106 may include speakers as another output device of the tool control storage device 106 for outputting the information.

In conjunction with the local PC and local database, the Access control device 306 is used to transmit user's authentication credential to the system authenticates a user's authorization for accessing automated tool control system 100. Specifically, access control device 306 is a component in the system used to limit or allow access to tool storage drawers 330. The methods and systems used to electronically identify the user requesting access may include any one or more of the following technologies, and others not mentioned, individually or in combination: RFID proximity sensors with cards; magstripe cards and scanners; barcode cards and scanners; common access cards and readers; biometric sensor ID systems, including facial recognition, fingerprint recognition, handwriting analysis, iris recognition, retinal scan, vein matching, voice analysis, and/or multimodal biometric systems.

The tool storage device 106 further includes a processor and software to electronically identify a user requesting access to the secure area or object storage device. For instance, when a user presents the user's credentials to an access control device 106, the access control device 306 recognizes the default language assigned to the user identification. The tool control storage device 106 accesses the language directory associated with the recognized default language in the database 104. The tool control storage device 106 configures the operational code in the tool control storage device 106 to display the text strings, audio files, and video files stored in the tool control storage device 106 according to the language directory associated with the default language of the user. For example, if the tool control storage device 106 is configured to display text, audio, and video messages in Portuguese, the tool control storage device 106 selects the appropriate text strings, audio files, and video files to be displayed from the Portuguese language directory. The same may be true for English, Spanish, Chinese, and other language files loaded in the language directories in the database 104.

This ensures the user's understanding of work instructions, tool selection, safety guidelines, torque settings, system and tool status alerts and warnings that may be presented via the user interface 305 and/or speakers provided on the tool control storage device 106. In some embodiments, unit of measurement (imperial/metric) can also be assigned to user identification and applied to the tool control storage device 106 when the user access credentials are presented to the access control device 306. In some other embodiments, the work orders associated with the user ID, tools associated with the work orders and user ID, and other user (e.g., co-workers) associated with the user ID may be used to configure the tool control storage device 106 when the user logs in using user's credentials.

Automated Tool Control system 100, through the use of one or more electronically controlled locking devices or mechanisms, keeps some or all storage drawers 330 locked in a closed position until access control device 306 is used to authenticate a user's authorization for accessing tool control storage device 106. If access control device 306 determines that a user is authorized to access tool control storage device 106, it unlocks some or all storage drawers 330, depending on the user's authorization level, allowing the user to remove or replace tools. In particular, the access control device 306 may identify predetermined authorized access levels to the system, and allow or deny physical access by the user to the three dimensional space or object storage devices based on those predetermined authorized levels of access.

Tool control storage device 106 may include several different sensing subsystems. In an illustrative example, the tool control storage device 106 includes an image sensing subsystem configured to capture images of contents or storage locations of the system. The image sensing subsystem may include lens-based cameras, CCD cameras, CMOS cameras, video cameras, or any types of device that captures images.

The image sensing subsystem is described in further detail below in relation to FIG. 3B. While FIG. 3B corresponds to the specific embodiment of the tool control storage device 106 shown in FIG. 1C, the teachings illustrated in FIG. 3B can be applied to each of the embodiments of FIGS. 1A-1C. Tool control storage device 106 further includes a data processing system, such as a computer, for processing images captured by the image sensing device. The data processing system includes one or more processors (e.g., micro-processors) and memory storing program instructions for causing the tool control storage device 106 to communicate electronically directly or through a network with sensing devices and obtain data from sensing devices relative to the presence or absence data of objects within the three dimensional space or object storage device. Images captured or received by the sensing subsystems are processed by the data processing system for determining an inventory condition of the system or each storage drawer. The term inventory condition as used throughout this disclosure means information relating to an existence/presence or non-existence/absence condition of objects in the storage system.

The data processing system may be part of tool control storage device 106. Alternatively, the data processing system can be a remote computer having a data link, such as a wired or wireless link, coupled to the tool control storage device 106, or a combination of a computer integrated in the tool control storage device 106 and a computer remote from the tool control storage device 106. Additionally, the data processing system can be connected to a computer network and exchange data with an administrative software application (e.g., as may be executed on a server) used to manipulate and store data and store and display information relative to the data to system users.

Figure 3A:
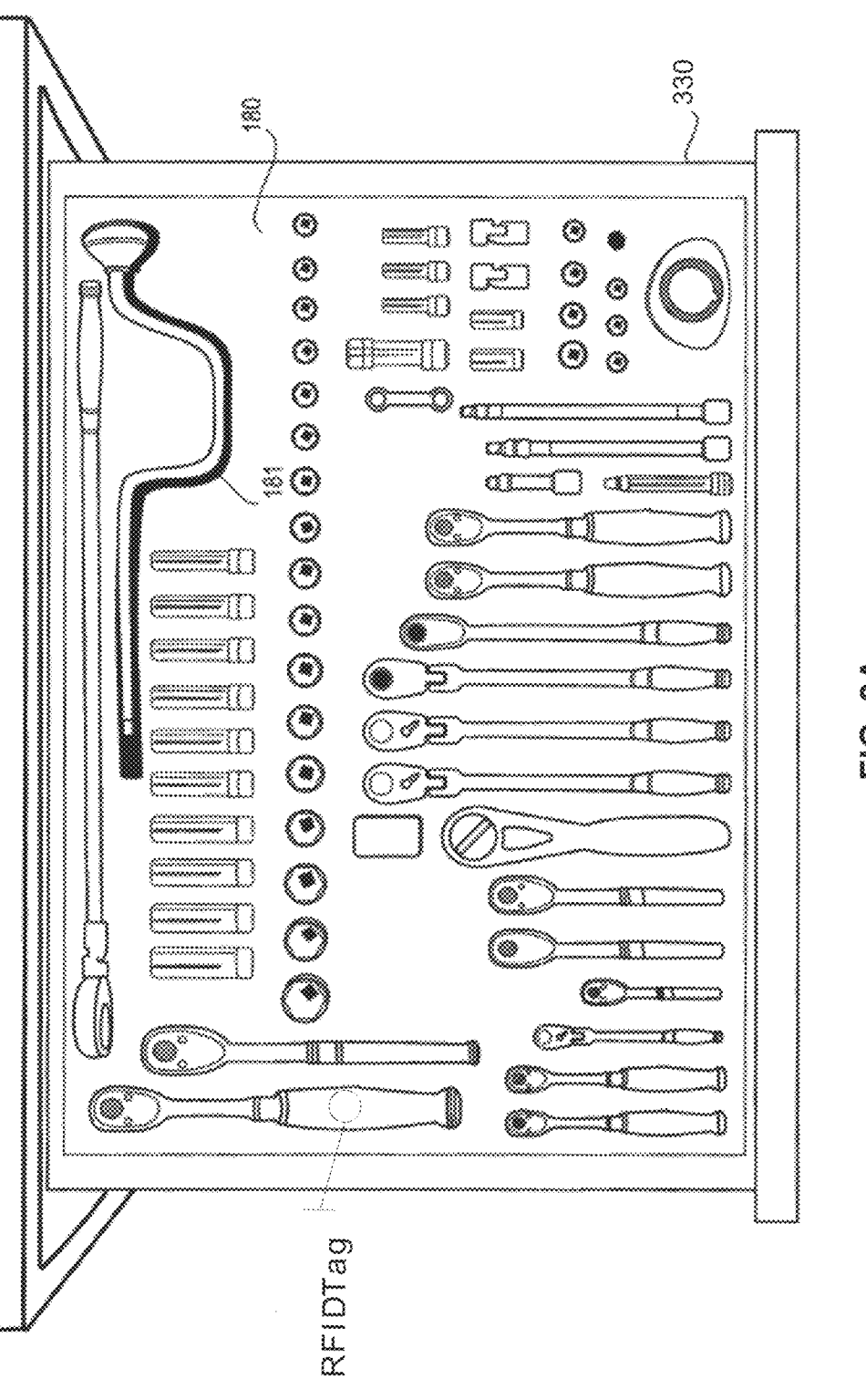
FIG. 3A depicts inside an exemplary storage drawer or tray of a tool storage device.
Figure 3B:
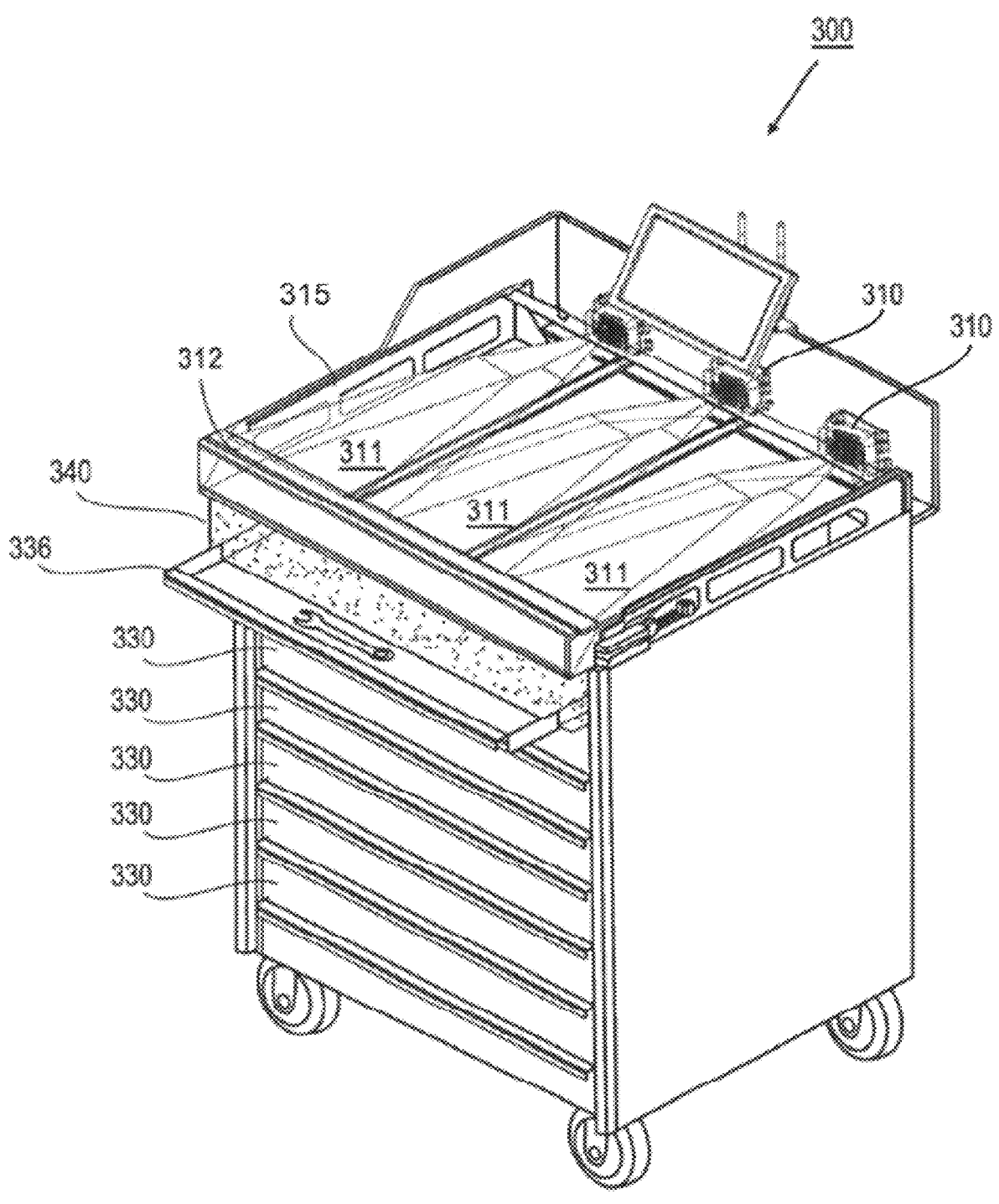
FIG. 3B depicts an alternative view of the tool storage device.
Figure 4A:
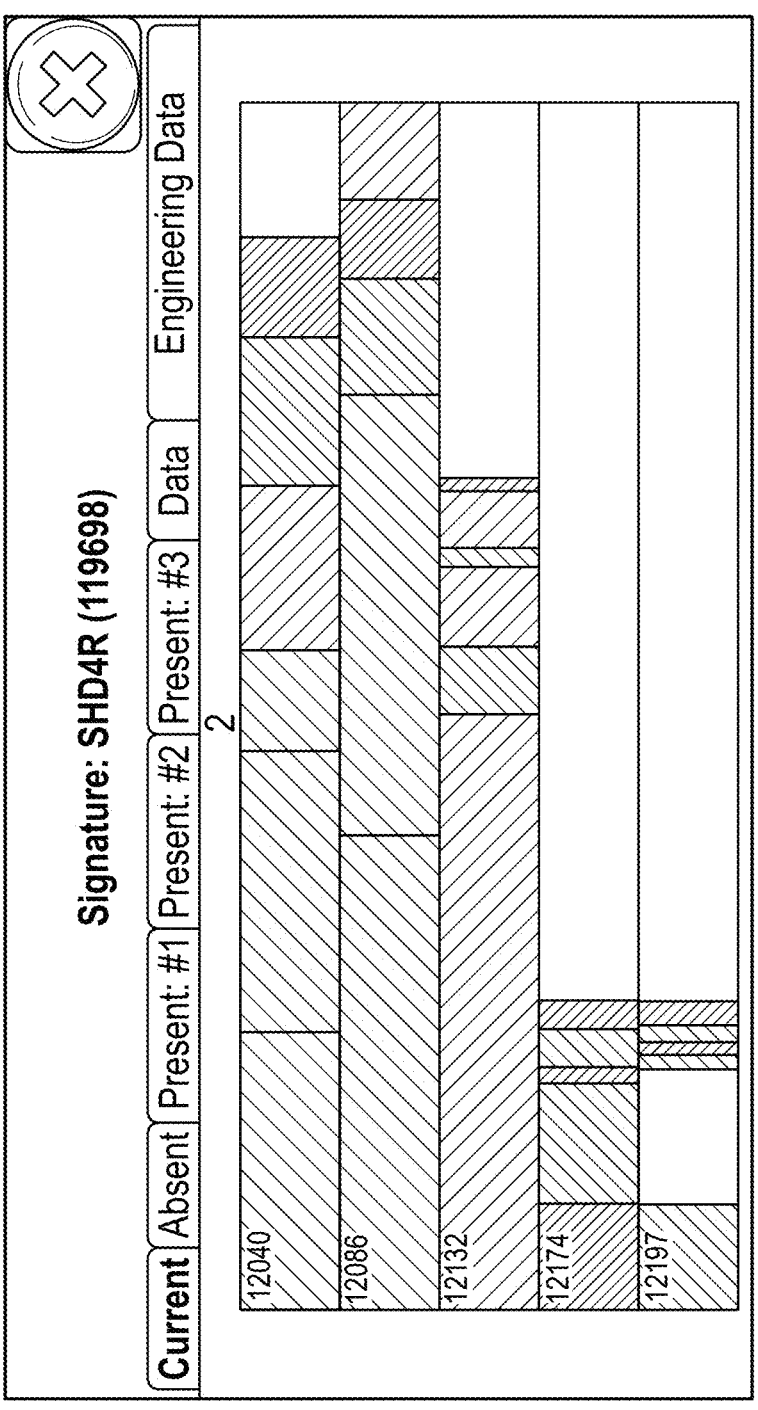
FIG. 4A-4D depicts displayed views of the colored blocks representing the tools in drawers of the tool storage system.
Figure 4B:
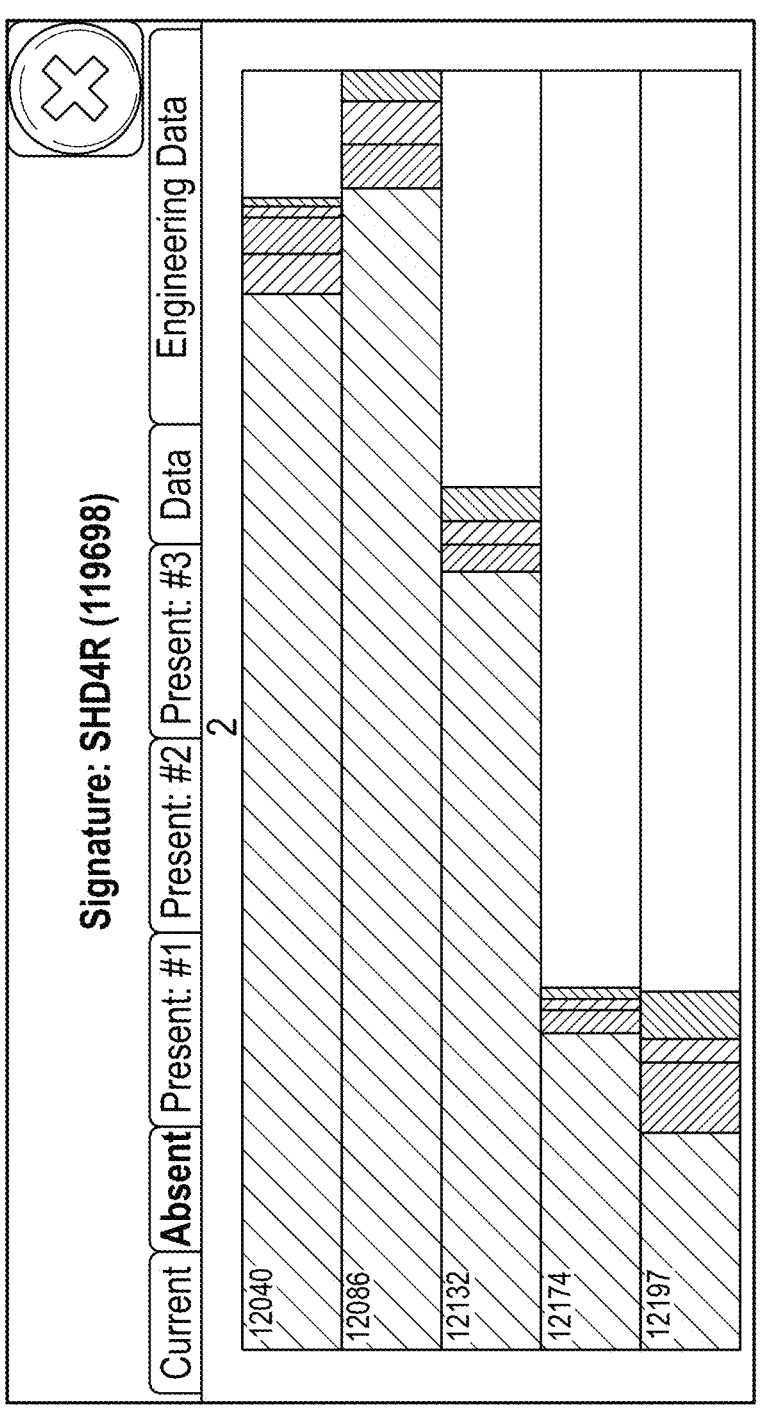
Figure 4C:
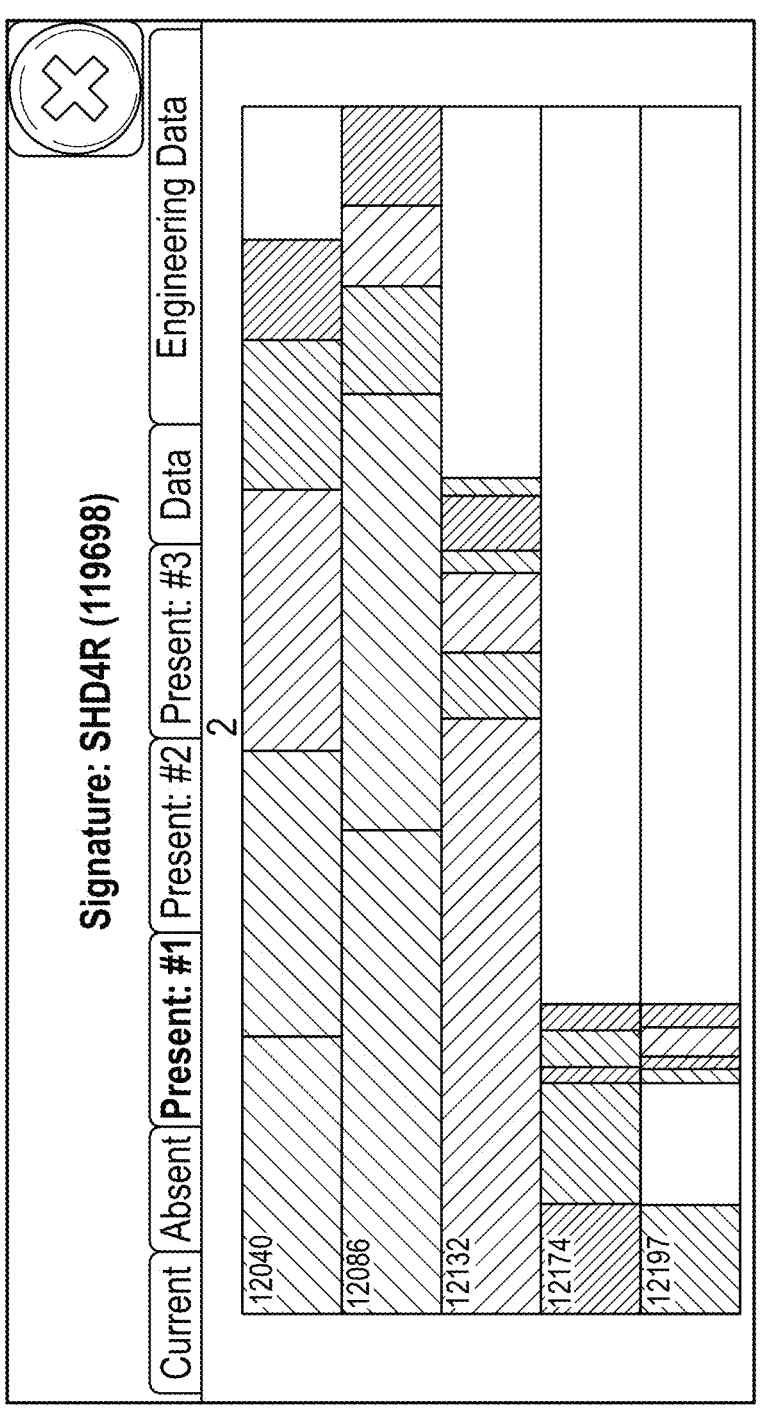
Figure 4D:
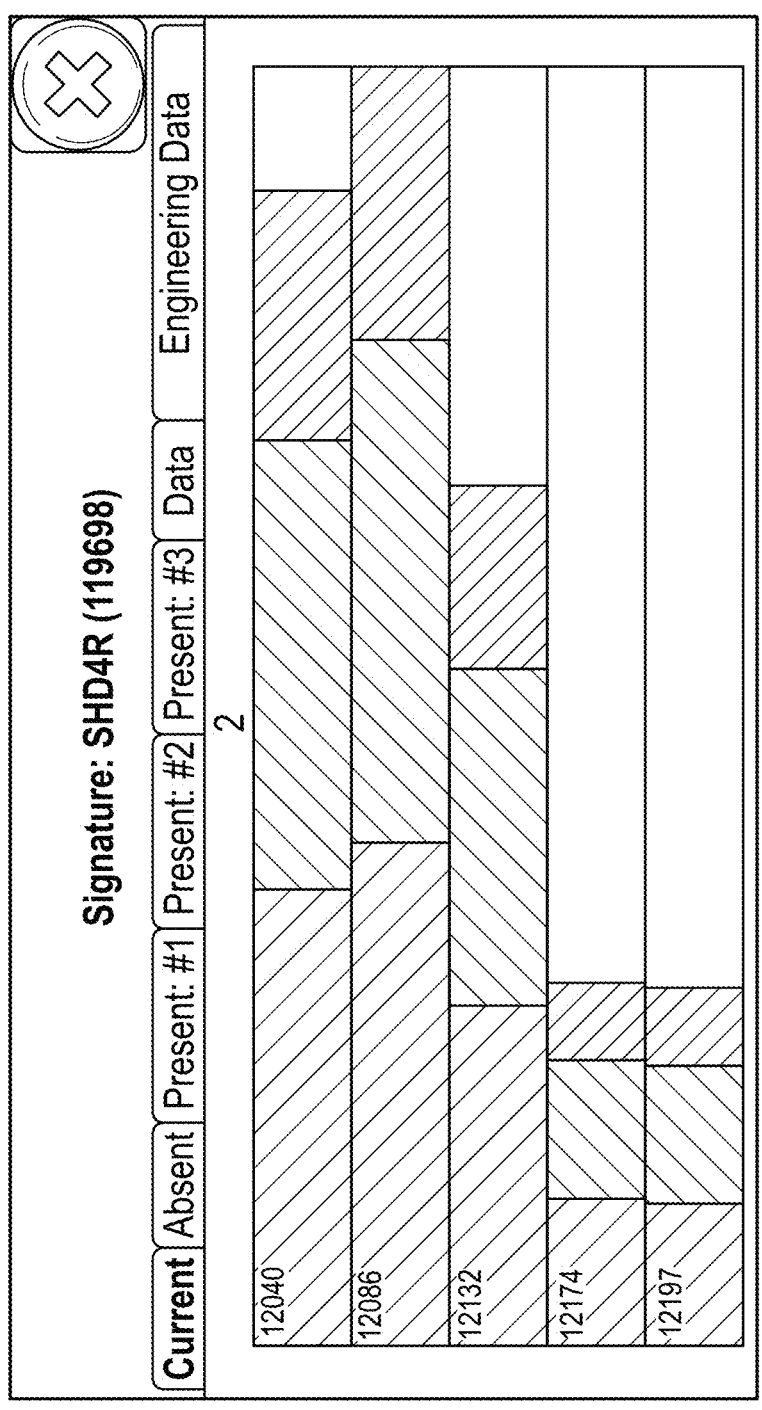

FIG. 3A shows a detailed view of one drawer 330 of the tool control storage device 106 in an open position. In some embodiments, each storage drawer 300 includes a foam base 180 having a plurality of storage locations, such as tool cutouts 181, for storing tools. Each cutout is specifically contoured and shaped for fittingly receiving a tool with corresponding shapes. Tools may be secured in each storage location by using hooks, Velcro, latches, pressure from the foam, etc.

In general, each storage drawer 330 includes multiple storage locations for storing various types of tools. As used throughout this disclosure, a storage location is a location in a storage system for storing or securing objects. In one embodiment, each tool has a specific pre-designated storage location in the tool storage system. FIG. 3B shows a perspective view of an imaging subsystem in tool control storage device 106 according to an embodiment. As illustrated in FIG. 3B, the tool control storage device 106 includes an imaging compartment 315 which houses an image sensing subsystem comprising three cameras 310 and a light directing device, such as a mirror 312 having a reflection surface 311 disposed at about 45 degrees downwardly relative to a vertical surface, for directing light reflected from drawers 330 to cameras 310. The directed light, after arriving at the cameras 310, allows the cameras 310 to form images of the drawers 330. The shaded area 340 below the mirror 312 represents a viewing field of the imaging sensing subsystem of the tool control storage device 106. As shown at 340, the imaging subsystem scans a portion of an open drawer 336 that passes through the field of view of the imaging sensing subsystem, for example as the drawer 336 is opened and/or closed. The imaging subsystem thereby captures an image of at least that portion of the drawer 336 that was opened. Processing of the captured image is used to determine the inventory conditions of tools and/or storage locations in the portion of the drawer 336 that was opened.

In general, the image sensing subsystem captures an image of a particular drawer 330 and performs an inventory of the drawer in response to detecting movement of the particular drawer. For example, the image sensing subsystem may perform an inventory of the drawer in response to detecting that the drawer is closing or has become completely closed. In other examples, the image sensing subsystem may image the drawer both as it is opening and as it closes.

A detailed example of one illustrative embodiment is provided below. In the illustrative embodiment, a physically defined, secure three dimensional object storage device is provided. The storage device is the container from which tools and/or objects are issued and/or returned. The physically defined, secure three dimensional object storage device is equipped with a processor and software operative to cause the device to communicate electronically directly or through a network with sensing devices and to obtain data from sensing devices indicating the presence or absence data of objects within the three dimensional object storage device. In the example, the sensing devices used within the three dimensional object storage device include machine vision identification devices such as cameras and encoders and decoders.

The physically defined, secure three dimensional object storage device is equipped with an electronically controlled locking mechanism, along with an access control device including a processor and software means to electronically identify a user requesting access to the secure area or object storage device. The processor and software identify predetermined authorized access levels to the system, and allow or deny physical access by the user to the three dimensional space or object storage devices based on those predetermined authorized levels of access.

The physically defined, secure object storage device is equipped with drawers. The processor and memory storing executable software program instructions of the storage device can be connected to a computer network, and can exchange data with an administrative software application (e.g., one executed on a remote server) used to manipulate and store data and store and display information relative to the data to system users.

In operation, a user scans or approaches an access card to the access control device of the storage device. The local processor of the storage device determines an access level of the user based on the access card. If the user is determined to be authorized for access to the storage device, the authorized user gains access to the object storage device. In turn, the sensing subsystems and data processing system of the storage device are activated. Light emitting diodes (LEDs) used for providing light to the system are activated, and cameras are activated. In turn, the latch of the storage system is unlocked, and the user opens one or more drawers and removes or returns one or more objects.

When the cameras are activated and the initial camera training scans are obtained for each silhouette, a tool detection algorithm sets a color frequency range with limits and tolerances on RGB color data matches for tool presence and absence and allows the system to then determine the actual status of stored items. The cameras provide Red, Green, and Blue (RGB) image data to the system for use in determining presence and absence of the stored items. The tool control system does this by defining silhouette profiles within defined Regions of Interest, training the cameras to acquire and store image related RGB color attributes (data) for the defined silhouettes when the stored items are both present and absent.

In normal operation, if the RGB color data in the scanned image closely matches the stored RGB color data for empty silhouette, the system will determine the item is absent. In normal operation, if the RGB color data in the scanned image closely matches the stored RGB color data for loaded silhouette, the system will determine the item is present. In normal operation, if the RGB color data from a scanned silhouette is between the limits of the presence and absence signatures, the system determines the silhouette to contain a "Wrong Tool".

Also in normal operation, if RGB data from a scanned silhouette has changed from the stored calibrated color attributes to such an extent that it no longer matches either the present or the absent signature, the system determines the silhouette to contain a "Wrong Tool". This can be a result of changes in the color of the tool or silhouette base layer from dirt, grim, grease, oil or other contaminant that builds up on their surfaces to such an extent the system cameras record RGB colors differing from the original.

In some cases, the RGB "Score" for the stored item and the base layer may be close to the same. An example of this occurs when tool is black or chrome, the silhouette is small, and a large percentage of the base of the silhouette is covered in etched numbers or letters. Another case is if a silhouette is relatively large, but the stored item surface area is small % of the total. For example, a thin-walled cylindrical tool stored on edge would result in a large percentage of the stored RGB data representing the base layer color and very little of the image RGB date would represent the actual tool. Minor changes from dirt, grease or external lighting changes could result in Wrong Tool exceptions being displayed when the correct item is in the silhouette.

On those occasions when the system cannot determine presence or absence of an item from the color data in a silhouette, the user can inspect and clean the silhouette and the yellow base layer, and they can clean the tools. The user could also retrain the present and absent color signatures of the offending silhouette and tool to reset the stored calibrated colors. Users sometimes adjust the "tolerance" of the presence or absence algorithm, thinking that by modifying the tolerance they are fixing a problem. In most cases they are simply making the system more accepting of inaccurate color data resulting in less reliable tool detection.

Sometimes, users will obtain and install silhouette shaped base layer plugs in the bottom of a silhouette in an attempt to match the absent signature to the absent calibration signature. The system records the RGB data for both present and absent signatures for each silhouette in log files, typically for use by trained Product Specialists or Engineers. Average users and system administrators do not have access to this data log, and they are not trained to decipher the contents of the log. Recurring instances of "Wrong Tool" occurrences in an automated control storage device disrupt production and maintenance procedures and negatively affect productivity and profitability. However, in the current system, there is not a simple and intuitive way for the user to determine color changes in the silhouette over time.

As shown in FIGS. 4A, 4B, 4C and 4D, the processor may comprise a diagnostic tool for display to a user. The diagnostic tool can visualize the colors of the storage device foam (located in a drawer or tray) and silhouette colors and the colors of the stored items. It uses data from the cameras and represents them to the user in visible form as a set of colored blocks (represented by the variation in the hatching patterns). The user can compare the original calibration signatures against the current signatures and make adjustments to the imaging system or recalibrate the silhouette image to the new color data. Adjustments may be manual or automated in the system.

The diagnostic tool uses the RGB color signatures for each silhouette and stored items to create and display color "blocks" representing the associated color data. The size of each colored block is proportional to the percentage of the RGB color data in the silhouette. By programming the system to represent the silhouette color data on the system display as a proportional representation in "block" form, the user can easily see and compare the current color of an empty silhouette vs the stored color of the same silhouette. In this way, the user can determine if changes in the yellow base layer are contributing factors to nuisance wrong tool occurrences.

The same is true for silhouettes with items stored in the pocket. The user can easily see and compare the current color of a loaded silhouette vs the stored color of the same silhouette. In this way, the user can determine if changes to the stored item are contributing factors to nuisance wrong tool occurrences. The components that make up the RGB color signatures consist of hue, saturation, and intensity. The hue is described as tint, saturation is the "boldness" of the color, with low saturation representing gray and high saturation representing yellow or red. Intensity is the brightness of the color. Zero brightness is black and max intensity is white. Specifically, the imaging subsystem is used to image the drawer as it opens and to image the drawer as it is closed (or once it is closed), and object presence and absence is determined using only the captured images. The inventory scan results are depicted on a display. As the user logs out, object status is transmitted via network to a primary database and/or to an administrative application. LED lights are turned off, the lock is engaged, and cameras are set in idle state.

Figure 5:
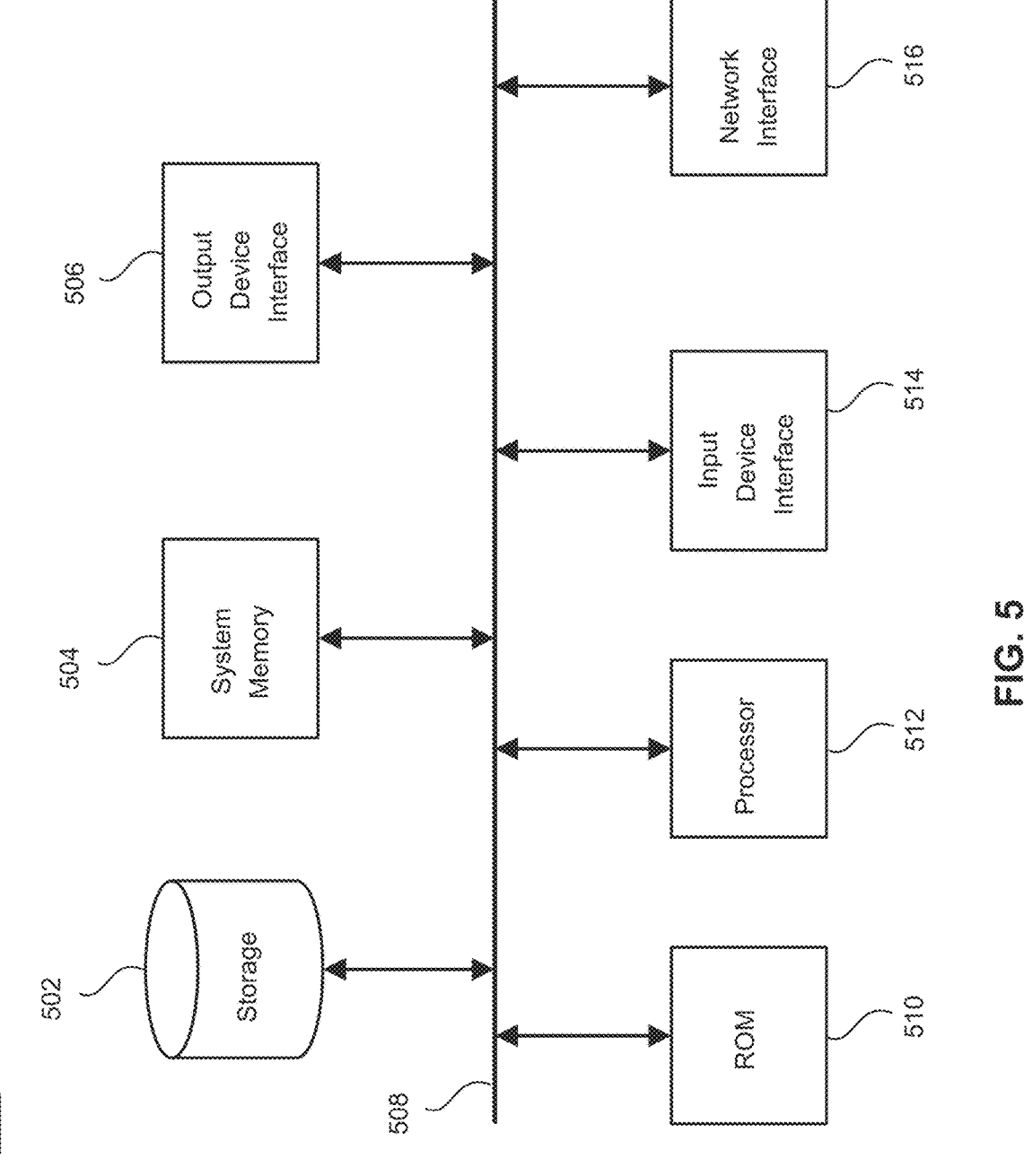
FIG. 5 illustrate functional block diagram illustrations of general purpose computer hardware platforms.

FIG. 5 conceptually illustrates an exemplary electronic system 500 within which some implementations of the subject technology can be implemented. In one or more implementations, the computing device 102 and the tool control storage devices 106 may be, or may include all or part of, the electronic system components that are discussed below with respect to the electronic system 500. The electronic system 500 can be a computer, phone, personal digital assistant (PDA), or any other sort of electronic device. Such an electronic system includes various types of computer readable media and interfaces for various other types of computer readable media. The electronic system 500 includes a bus 508, processing unit(s) 512, a system memory 504, a read-only memory (ROM) 510, a permanent storage device 502, an input device interface 514, an output device interface 506, and a network interface 516.

The bus 508 collectively represents all system, peripheral, and chipset buses that communicatively connect the numerous internal devices of the electronic system 500. For instance, the bus 508 communicatively connects the processing unit(s) 512 with the ROM 510, system memory 504, and permanent storage device 502. From these various memory units, the processing unit(s) 512 retrieves instructions to execute and data to process in order to execute the processes of the subject disclosure. The processing unit(s) can be a single processor or a multi-core processor in different implementations.

The ROM 510 stores static data and instructions that are needed by the processing unit(s) 512 and other modules of the electronic system. The permanent storage device 502, on the other hand, is a read-and-write memory device. This device is a non-volatile memory unit that stores instructions and data even when the electronic system 500 is off. Some implementations of the subject disclosure use a mass-storage device (for example, a magnetic or optical disk, or flash memory) as the permanent storage device 502.

Other implementations use a removable storage device (for example, a floppy disk, flash drive) as the permanent storage device 502. Like the permanent storage device 502, the system memory 504 is a read-and-write memory device. However, unlike the storage device 502, the system memory 504 is a volatile read-and-write memory, such as a random access memory. The system memory 504 stores some of the instructions and data that the processor needs at runtime. In some implementations, the processes of the subject disclosure are stored in the system memory 504, the permanent storage device 502, or the ROM 510. For example, the various memory units include instructions for displaying graphical elements and identifiers associated with respective applications, receiving a predetermined user input to display visual representations of shortcuts associated with respective applications, and displaying the visual representations of shortcuts. From these various memory units, the processing unit(s) 512 retrieves instructions to execute and data to process in order to execute the processes of some implementations.

The bus 508 also connects to the input and output device interfaces 514 and 506. The input device interface 514 enables the user to communicate information and select commands to the electronic system. Input devices used with the input device interface 514 include, for example, alphanumeric keyboards and pointing devices (also called "cursor control devices"). The output device interface 506 enables, for example, the display of images generated by the electronic system 500. Output devices used with the output device interface 506 include, for example, printers and display devices, for example, cathode ray tubes (CRT) or liquid crystal displays (LCD). Some implementations include devices, for example, a touchscreen that functions as both input and output devices.

Finally, as shown in FIG. 5, the bus 508 also couples the electronic system 500 to a network (not shown) through a network interface. In this manner, the computer can be a part of a network of computers (for example, a LAN, a WAN, or an Intranet, or a network of networks, for example, the Internet). Any or all components of the electronic system 500 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, magnetic media, optical media, electronic media, etc. The computer readable media does not include carrier waves and electronic signals passing wirelessly or over wired connections.

Unless otherwise stated, all measurements, values, ratings, positions, magnitudes, sizes, and other specifications that are set forth in this specification are approximate, not exact. They are intended to have a reasonable range that is consistent with the functions to which they relate and with what is customary in the art to which they pertain. Except as stated immediately above, nothing that has been stated or illustrated is intended or should be interpreted to cause a dedication of any component, step, feature, object, benefit, advantage, or equivalent to the public.

In this specification, the term "software" is meant to include, for example, firmware residing in read-only memory or other form of electronic storage, or applications that may be stored in magnetic storage, optical, solid state, etc., which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra-density optical discs, any other optical or magnetic media, and floppy disks. The computer-readable media can store a computer program that is executable by at least one processing unit and includes sets of instructions for performing various operations. Examples of computer programs or computer code including machine code, for example, produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, where reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

To the extent that the systems discussed herein collect usage data associated with users, or may make use of the usage data, the users are provided with opportunities to control whether programs or features collect usage data (e.g., a user's preferences), and to control the user interface (UI) associated with applications based on the collected usage data. The users may also be provided with options to turn on or turn off certain features or functions provided by the systems. In some aspects, the users may elect to disable features and functions (e.g., control the UI associated with applications based on the collected usage data) offered by the systems discussed herein. In addition, users may stipulate that certain data be treated in one or more ways before it is stored or used, so that personally identifiable information is removed. For example, a user's identity may be treated so that no personally identifiable information can be determined for the user, or a user's geographic location may be generalized where location information is obtained (such as to a city, zip code, or state level), so that a particular location of a user cannot be determined. Thus, the user has control over whether and how user information is collected, stored, and used by the disclosed systems.

All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. Furthermore, to the extent that the term "include", "have", or the like is used in the description or the claims, such term is intended to be inclusive in a manner similar to the term "comprise" as "comprise" is interpreted when employed as a transitional word in a claim.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

In the foregoing Description, it can be seen that various features are grouped together in various embodiments for the purpose of streamlining the disclosure. This method of disclosure is not to be interpreted as reflecting an intention that the claimed embodiments require more features than are expressly recited in each embodiment. Rather, inventive subject matter lies in less than all features of a single disclosed embodiment.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended that this disclosure cover any and all applications, modifications and variations that fall within the true scope of the present teachings.

What is claimed:

1. An inventory control system comprising:
    a tool storage device including a drawer, a tray, or a shelf having a plurality of storage locations for storing a plurality of objects, wherein the plurality of objects defines a silhouette in the tool storage device;
    a sensing device configured to sense color;
    a display device configured to display information about the inventory control system; and a processor configured to:

determine a color signature of the silhouette of each object of the plurality of objects stored in the tool storage device; and generate at least one image in comprising an arrangement of colored blocks, wherein the color blocks represent color data associated with the plurality of objects and a size of each color block is proportional to a percentage of color data in the color signature of each silhouette; and display the arrangement of colored blocks.

2. The inventory control system of claim 1, wherein the drawer, the tray or the shelf comprises foam.

3. The inventory control system of claim 1, wherein the sensing device is a camera, configured to capture RGB color data.

4. The inventory control system of claim 1, wherein the processor is further configured to calibrate color signatures in comparison to previous color signatures and make adjustments to the sensing device.

5. The inventory control system of claim 4, wherein the processor is configured to:

receive updated color data; and recalibrate the color signatures using updated color data and make adjustments to the sensing device.

6. The inventory control system of claim 1, wherein the size of the color block is proportional to a signature of color data.

7. The inventory control system of claim 4, wherein the color signatures consist of hue, saturation, and intensity.

8. The inventory control system of claim 1, wherein the color data associated with a silhouette is stored for comparison to a current status of the plurality of objects in the storage device.

9. A method determining a location status of an item in a tool storage device, comprising:

receiving color data from a sensing device;

identifying a silhouette of each object of a plurality of objects stored in the tool storage device;

determining a color signature of each silhouette of the plurality of objects stored in the tool storage device;

generating at least one image in comprising an arrangement of colored blocks, wherein the color blocks represent color data associated with the plurality of objects and a size of each color block is proportional to a percentage of color data in the color signature of each silhouette; and displaying the arrangement of colored blocks on a display device.

10. The method of claim 9, wherein the sensing device is a camera configured to capture RGB color data.

11. The method of claim 9, further comprising calibrating color signatures in comparison to a previous color signature and adjusting the capture of color attributes to the sensing device.

12. The method of claim 11, further comprising:

receiving updated color data;

recalibrating the color signatures using updated color data; and adjusting the color attributes of the color data.

13. The method of claim 9, wherein the size of the color block is proportional to identified silhouette color data.

14. The method of claim 9, wherein color signatures consist of hue, saturation, and intensity.

15. The method of claim 9, wherein the color data associated with a silhouette is stored for comparison to a current status of the plurality of objects in the storage device.

16. A non-transitory computer-readable storage medium comprising instructions stored thereon, which when executed by one or more processors, cause the one or more processors to perform operations for determining a location status of an item in a tool storage device, comprising:

receiving color data from a sensing device;

determining a color signature of each silhouette of a plurality of objects stored in a tool storage device;

generating at least one image in comprising an arrangement of colored blocks, wherein the color blocks represent color data associated with the plurality of objects and a size of each color block is proportional to a percentage of color data in the color signature of each silhouette; and displaying the arrangement of colored blocks on a display device.

17. The non-transitory computer-readable storage medium of claim 16, further comprising:

receiving updated color data;

recalibrating color signatures using updated color data; and adjusting the color attributes of the color data.

18. The non-transitory computer-readable storage medium of claim 16, wherein the size of the color block is proportional to identified silhouette color data.

19. The non-transitory computer-readable storage medium of claim 16, wherein color signatures consist of hue, saturation, and intensity.

20. The non-transitory computer-readable storage medium of claim 16, wherein the color data associated with a silhouette is stored for comparison to a current status of the plurality of objects in the storage device.

* * * * *